(12) United States Patent
Boger

(10) Patent No.: US 7,791,873 B2
(45) Date of Patent: Sep. 7, 2010

(54) STORAGE COMPONENT OF A SERVER ARRANGEMENT WITH A PLURALITY OF HARD DISK DRIVES

(76) Inventor: Robert A. Boger, 913 S. Rustin, Sioux City, IA (US) 51106

( * ) Notice: Subject to any disclaimer, the term of this patent is extended or adjusted under 35 U.S.C. 154(b) by 0 days.

(21) Appl. No.: 12/008,280

(22) Filed: Jan. 10, 2008

(65) Prior Publication Data
US 2009/0179535 A1    Jul. 16, 2009

(51) Int. Cl.
*H05K 7/14* (2006.01)
(52) U.S. Cl. ................ 361/679.37; 361/724; 312/223.2
(58) Field of Classification Search ............ 361/679.33, 361/724, 679.37; 312/223.2
See application file for complete search history.

(56) References Cited

U.S. PATENT DOCUMENTS

| | | | | |
|---|---|---|---|---|
| 6,460,098 B1 * | 10/2002 | Paul | ............................ | 710/62 |
| 6,510,050 B1 * | 1/2003 | Lee et al. | ................ | 361/679.33 |
| 6,553,458 B1 | 4/2003 | Freund | | |
| 6,862,173 B1 * | 3/2005 | Konshak et al. | ........ | 361/679.33 |
| 7,312,999 B1 * | 12/2007 | Miyamura et al. | .......... | 361/724 |
| 2002/0181197 A1 * | 12/2002 | Huang | ........................ | 361/685 |
| 2006/0061955 A1 * | 3/2006 | Imblum | ...................... | 361/685 |
| 2008/0239649 A1 * | 10/2008 | Bradicich et al. | ........... | 361/683 |

* cited by examiner

*Primary Examiner*—Jayprakash N Gandhi
*Assistant Examiner*—Ingrid Wright
(74) *Attorney, Agent, or Firm*—WPAT, P.C.; Anthony King

(57) ABSTRACT

A storage component of a server arrangement includes a backplane and a plurality of trays, each of the plurality of trays including at least one frame, at least one frame having at least one hard disk drive mounted thereto, and all of the plurality of trays being configured to receive at least one hard disk drive. Each of the plurality of trays includes a connector adapted to connect the at least one hard disk drive to the backplane.

16 Claims, 2 Drawing Sheets

STORAGE COMPONENT OF A SERVER ARRANGEMENT WITH A PLURALITY OF HARD DISK DRIVES

BACKGROUND AND SUMMARY

The present invention relates generally to server arrangements and, more particularly, to a storage component of server arrangement comprising a plurality of hard disk drives.

As capabilities and power of computers, including servers, increase, they often tend to require more and more space. Storing information on tape backup units is proving increasingly inadequate as they tend to be unable to keep up with modern computers' space and speed requirements. Hard disk drive backups are becoming more common.

In computers, including servers, hard disk drives such as Small Computer System Interface Service Component Architecture (SCSI SCA) drives connect directly to a backplane. Due to limits on the size of the front of the unit, only a limited number of drives can fit in a system. Typical racks for servers, network switches, and other devices are 19" (482.6 mm) wide. A typical measure of size for such racks is the rack unit U, and a device that is 1 U is 1.75" (44.45 mm) high. In a 1 U server such as the Gateway 9415 1 U Rack Mount Server, available from Gateway, Inc., 7565 Irvine Center Drive, Irvine, Calif. 92618, only three hard disk drives can be fit across the front of the server.

It is desirable to provide a server that is adapted to house a plurality of hard disk drives. It is also desirable to provide a server that is adapted to house a plurality hard disk drives in a manner that facilitates replacing hard disk drives.

In accordance with an aspect of the present invention, a storage component of a server arrangement comprises a backplane and a plurality of trays, each of the plurality of trays comprising at least one frame, at least one frame having at least one hard disk drive mounted thereto, and all of the plurality of trays being configured to receive at least one hard disk drive, each of the plurality of trays comprising a connector adapted to connect the at least one hard disk drive to the backplane.

In accordance with another aspect of the present invention, a storage component of a server arrangement comprises a tray having a backplane, a backplane connector on the backplane configured to communicatively couple to a rack, and at least one secondary connector communicatively coupled to the backplane connector and spaced from the backplane to permit positioning of a hard disk drive connected to the secondary connector such that the hard disk drive is spaced from the backplane.

In accordance with another aspect of the present invention, a storage component of a server arrangement comprises a backplane, a tray, a controller mounted on the tray, a connector for connecting the controller to the backplane, and at least one hard disk drive mounted to the tray on opposite sides of the controller and a hard disk drive connector for connecting the hard disk drive to the controller.

In accordance with another aspect of the present invention, a disk drive mounting system for a rack mounting system comprises a rack comprising a backplane, and a tray mountable on the rack, the tray having a backplane alignable with backplanes of at least one other server component when the tray and the at least one other server component are mounted on the rack and backplanes of the tray and the at least one other server component are connected to the backplane of the rack by a backplane connector of the tray and backplane connector of the at least one other server component. The system further comprises at least one frame for receiving a disk drive, the at least one frame being mounted on the tray, the at least one frame including an auxiliary connector connectable to the disk drive when the disk drive is received in the tray, the auxiliary connector being in communication with the backplane connector of the tray, wherein the auxiliary connector of the at least one frame is positioned forwardly of the backplane of the tray so that a disk drive connected to the auxiliary connector is spaced forwardly of the backplane when the disk drive is received in the at least one frame.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
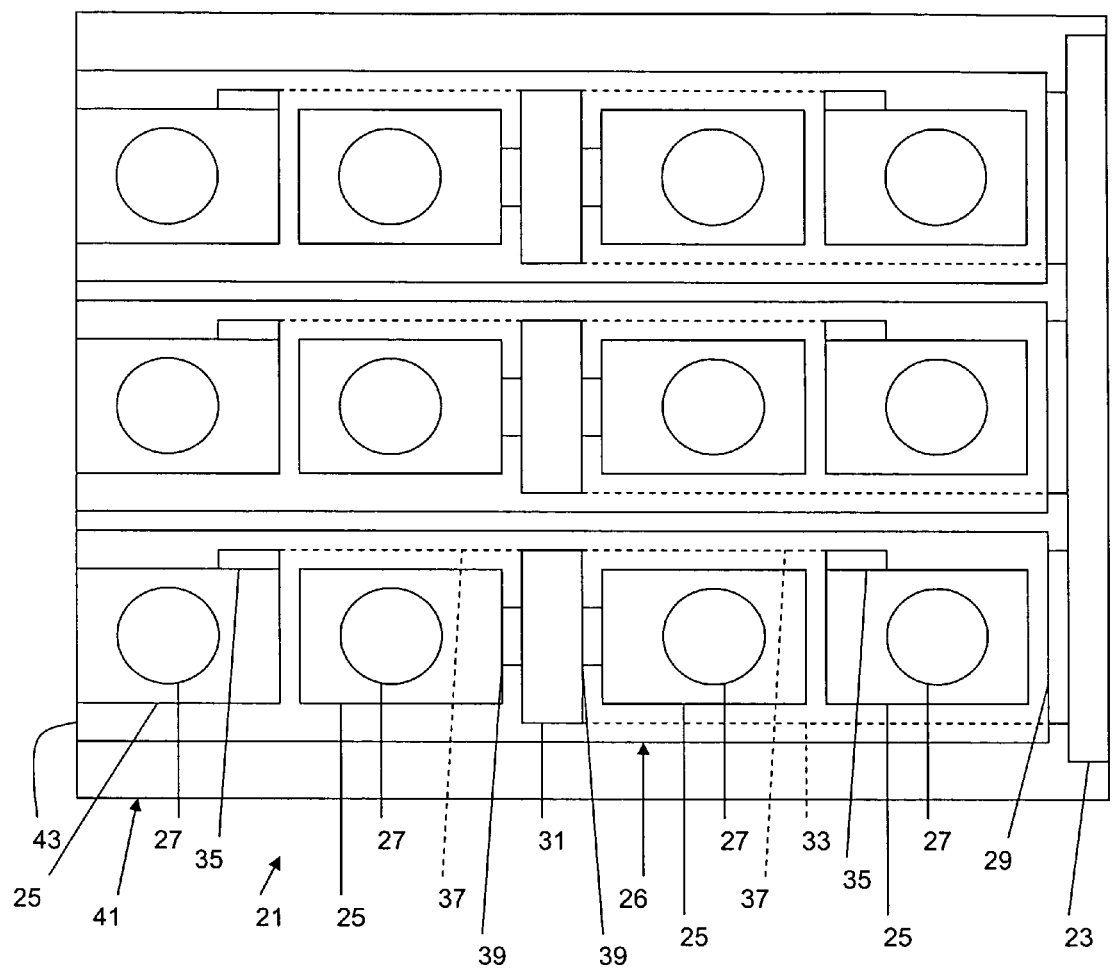
FIG. 1 schematically shows a storage component of a server arrangement according to an embodiment of the present invention.

A storage component of a server arrangement 21 according to an embodiment of the present invention is shown in FIG. 1. The storage component of a server arrangement 21 comprises a frame or rack 41 having a front 43 with an opening, a backplane 23 on an opposite side of the rack from the opening, and one or more, typically a plurality of, frames 25, on one or more, typically a plurality of, trays 26. Each tray 26 typically comprises a plurality of frames 25. The frames 25 and/or the trays 26 are adapted to be received in the opening at the front 43 of the rack 41 and connected to the backplane 23. A hard disk drive 27 is mounted to at least one, ordinarily all, of the plurality of frames 25. Some frames 25 may have no hard disk drive, and some may have one or more hard disk drives 27. Ordinarily, all of the plurality of trays 26 are configured to receive at least one hard disk drive 27. Each of the plurality of trays 26 comprises a connector 29 adapted to connect the at least one hard disk drive 27 to the backplane 23. The connector 29 is typically a backplane connector disposed at a backplane of the tray 26, and is typically adapted to align with backplanes of other server components, such as other trays, when connected to the backplane 23 of the rack 41. The connector 29 is any one of a number of suitable connectors, such as an SCA, Serial Attached SCSI (SAS), Serial Advanced Technology Attachment (SATA), or fiber channel drive connector. Ordinarily, each of the hard disk drives 27 has a connector (not shown) that permits removably connecting the hard disk drive to the connector 29 on the tray 26.

Where a plurality of hard disk drives 27 are mounted to a tray 26, they can be mounted to opposite sides of a controller 31. The controller 31 can be adapted to present the plurality of hard disk drives 27 as a single drive, such as in a Redundant Array of Independent Disks (RAID) array. Additional hard disk drives 27 can be connected to the hard disk drives 27 connected to the controller 31. The additional hard disk drives 27 can be connected to one another side by side or back to back, or in any suitable manner. The controller 31 can be connected to the connector 29 in any suitable manner, such as by wiring 33 (shown in phantom) which may, for example, be printed on the tray 26, which may be in the form of a Printed Circuit Board (PCB) to which the controller 31 is mounted.

If more than one hard disk drive 27 is mounted to the tray 26 on either side of the controller 31, any suitable connection of the hard drives can be provided, such as a suitable secondary or auxiliary connector 35 and wiring 37 that connects each hard disk drive to the controller. The secondary or auxiliary connector 35 permits positioning of the hard disk drives 27 forwardly of the backplane 23 and permits a connection of the hard disk drives 27 to the backplane 23 other than directly via the backplane connector 29. A hard disk drive 27 substantially adjacent the controller 31 can be connected directly to the controller by any suitable connector 39. The frame 25 may be omitted from the tray 26, particularly when hard disk drives 27 are only connected directly to opposite sides of the controller 31, and a connection from the controller to the connector 29 need not be associated with a frame.

Figure 2:
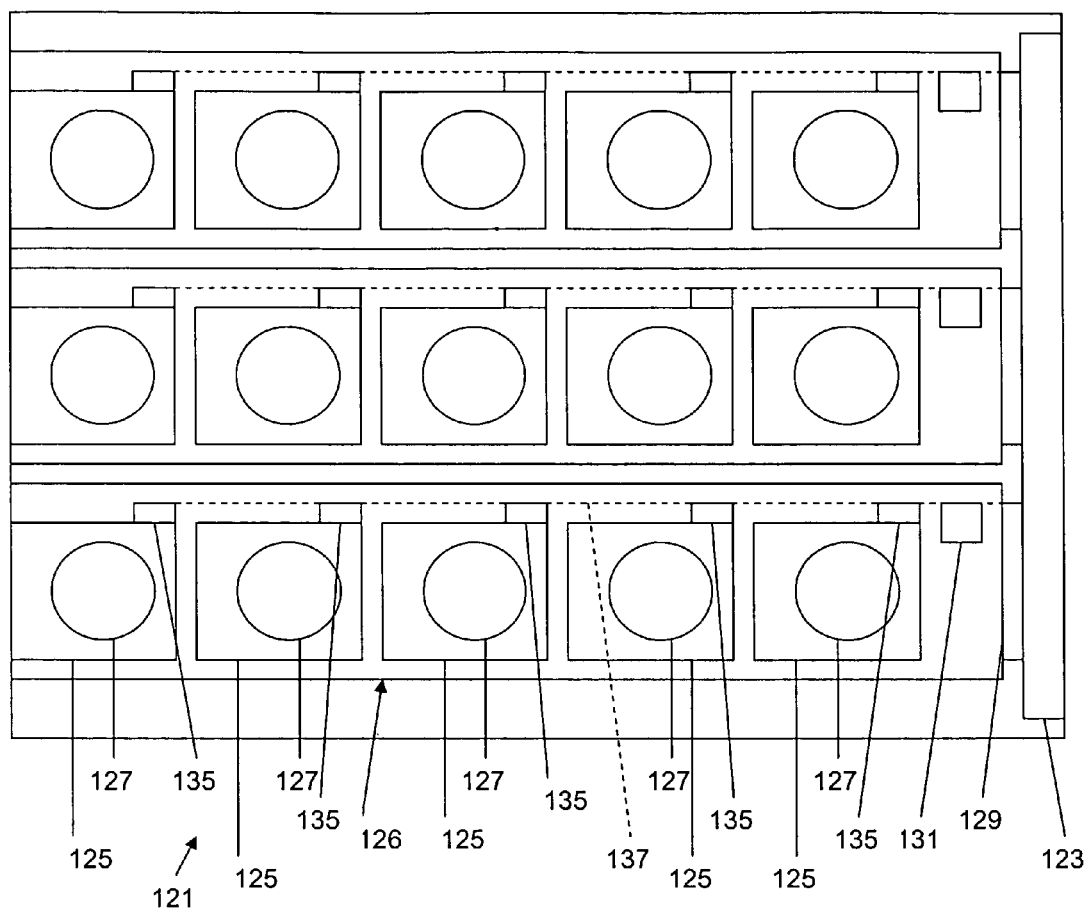
FIG. 2 schematically shows a storage component of a server arrangement according to another embodiment of the present invention.

Another embodiment of a storage component of a server arrangement 121 is shown in FIG. 2. The storage component of a server arrangement 121 comprises a backplane 123 and a plurality of trays 126 and/or frames 125. A hard disk drive 127 is mounted to at least one, ordinarily all, of the plurality of frames 125. Ordinarily, all of the plurality of trays 126 are configured to receive at least one hard disk drive 127. Each of the plurality of trays 126 comprises, at a backplane of the tray, a backplane connector 129 adapted to connect the at least one hard disk drive 127 to the backplane 123. The backplane connector 129 is any one of a number of suitable connectors, such as an SCA, SAS, SATA, or fiber channel drive connector.

A controller 131 may be mounted to the at least one of the trays 126 to which a plurality of hard disk drives 127 are mounted for presenting the plurality of hard disk drives on the at least one of the plurality of frames and/or trays as a single drive. The controller may, however, be external to the tray 126. Alternatively, no controller may be provided at all.

Each hard disk drive 127 can be provided with suitable secondary or auxiliary connectors 135 for connecting the hard disk drives to the controller 131, such as via wiring 137, which wiring may be of any suitable type, such as wiring that is printed on a frame and/or tray in the form of a PCB. The controller 131 can be connected to the backplane 123 in any suitable form, such as by being wired to the connector 129 which connects to the backplane. The secondary or auxiliary connectors 135 facilitate positioning of the hard disk drives 127 forwardly of the backplane 123 and permit a connection of the hard disk drives 127 to the backplane 123 other than directly via the backplane connector 129.

The storage component of a server arrangement 21 and 121 ordinarily comprises a server frame 41 and 141, respectively, in which the plurality of trays 26 and 126 are mounted. The following discussion pertains to both the storage component of a server arrangement 21 and 121, except as otherwise indicated, and, for purposes, of discussion, the storage component of a server arrangement 121 will be discussed, it being understood that the discussion pertains as well to the storage component of a server arrangement 21. The connector 129 can be of a type that conveniently permits the hard disk drives 127 on each tray 126 to be connected to and disconnected from the backplane 123, such as a plug-type connector. At least one, ordinarily all, of the plurality of frames is slidably removable from the server frame 141 when the connector 129 is disconnected from the backplane 123.

Each frame 125 or tray 126 may comprise a shell, such as by the frame or tray being in the form of a shell, that encloses at least one hard disk drive 127. By providing a frame 125 or tray 126 comprising a shell, the frame or tray can be conveniently removed from the server 121 and safely stored with minimal risk to the components inside the shell. Where a frame 125 forms part of a tray 126, the shell can comprise a connector for connecting the shell to the tray.

The present invention facilitates construction of storage components of server arrangements of minimal dimensions and substantial capacity. A plurality of hard disk drives 127 can be provided in a storage component of a server arrangement that need not be more than 1 U in height. For example, by providing three controllers 31 with hard disk drives 27 mounted on opposite sides of each controller, a storage component of a server arrangement with at least six hard disk drives can be provided where, previously, only three hard disk drives would have been provided. Depending upon the size of the disk in the hard disk drive (e.g., 2.5" or 3.5"), it is presently contemplated that as many as fifteen hard disk drives can be provided in a single storage component of a 1 U server arrangement. The controller(s) can be adapted to present plural disk drives as a single disk drive, such as in a RAID array, and a variety of RAID implementations can be provided, such as RAID 0, RAID 1, RAID 10, RAID 30, or RAID 50.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A storage component of a server arrangement, comprising:
   a backplane;
   a plurality of trays, each of the plurality of trays comprising at least one frame, the at least one frame having at least one hard disk drive mounted thereto, and all of the plurality of trays being configured to receive the at least one hard disk drive, each of the plurality of trays comprising a connector adapted to connect the at least one hard disk drive to the backplane;
   a controller mounted to at least one of the trays wherein the controller is offset a distance from the backplane; and
   at least one secondary connector is communicatively coupled to the controller and is offset a distance from the backplane to permit positioning of the at least one hard disk drive,
   wherein the controller is adapted for presenting the at least one hard disk drive on at least one of a plurality of frames as a single drive;
   wherein each hard disk drive that is substantially adjacent the controller is connected directly to the controller by a third connector; and
   wherein the at least one secondary connector permits connection and positioning forwardly of the backplane of each hard disk drive that is not substantially adjacent the controller.

2. The storage component of a server arrangement as set forth in claim 1, wherein a plurality of hard disk drives on at least one of the plurality of trays are mounted to opposite sides of the controller.

3. The storage component of a server arrangement as set forth in claim 2, wherein the controller is adapted to present at least two of the plurality of hard disk drives as a single drive.

4. The storage component of a server arrangement as set forth in claim 1, comprising a server frame in which the plurality of trays are mounted, at least one of the plurality of trays being associated with the at least one secondary connector for connecting the at least one hard disk drive on the tray to the backplane and the at least one of the plurality of trays being slidably removable from the server frame when the connector is disconnected from the backplane.

5. The storage component of a server arrangement as set forth in claim 1, wherein the storage component of the server arrangement is no more than 1 U in height.

6. The storage component of a server arrangement as set forth in claim 5, comprising at least six hard disk drives.

7. The storage component of a server arrangement as set forth in claim 1, wherein the at least one frame having the at least one hard disk drive mounted thereto comprises a shell for enclosing the at least one hard disk drive mounted to the at least one frame having the at least one hard disk drive mounted thereto.

8. A storage component of a server arrangement, comprising:
a tray having a backplane;
a backplane connector on the backplane configured to communicatively couple to a rack;
at least one secondary connector communicatively coupled to the backplane connector and spaced from the backplane to permit positioning of a hard disk drive connected to the at least one secondary connector such that the hard disk drive is spaced from the backplane;
a controller associated with the hard disk drive, wherein each hard disk drive that is substantially adjacent the controller is connected directly to the controller by a third connector; and
wherein the at least one secondary connector permits connection and positioning forwardly of the backplane of each hard disk drive that is not substantially adjacent the controller.

9. The storage component of a server arrangement as set forth in claim 8, comprising a server frame in which a plurality of hard disk drives are adapted to be disposed when connected to the backplane.

10. The storage component of a server arrangement as set forth in claim 9, wherein each of the plurality of hard disk drives is associated with the at least one secondary connector for connecting the plurality of hard disk drives to the backplane and at least one of a plurality of frames being slidably removable from the front end of the server frame when the connector is disconnected from a backplane.

11. The storage component of a server arrangement as set forth in claim 10, wherein at least two of the plurality of hard disk drives are each associated with a common connector.

12. The storage component of a server arrangement as set forth in claim 11, wherein the at least two of the plurality of hard disk drives are mounted to a common tray.

13. The storage component of a server arrangement as set forth in claim 12, wherein the common tray comprises a shell enclosing the at least two of the plurality of hard disk drives.

14. The storage component of a server arrangement as set forth in claim 11, wherein the at least two of the plurality of hard disk drives are mounted to opposite sides of the controller.

15. The storage component of a server arrangement as set forth in claim 11, wherein the controller associated with the at least two of the plurality of hard disk drives presents the at least two of the plurality of hard disk drives as a single drive.

16. The storage component of a server arrangement as set forth in claim 9, wherein the at least one secondary connector permits positioning of the hard disk drive proximate a front end of the server frame, the front end being disposed on an opposite side of the server frame than the backplane.

\* \* \* \* \*